July 7, 1931. M. J. LACHANCE 1,813,578
COMPOUNDING SCALE
Filed Jan. 13, 1930    2 Sheets-Sheet 1
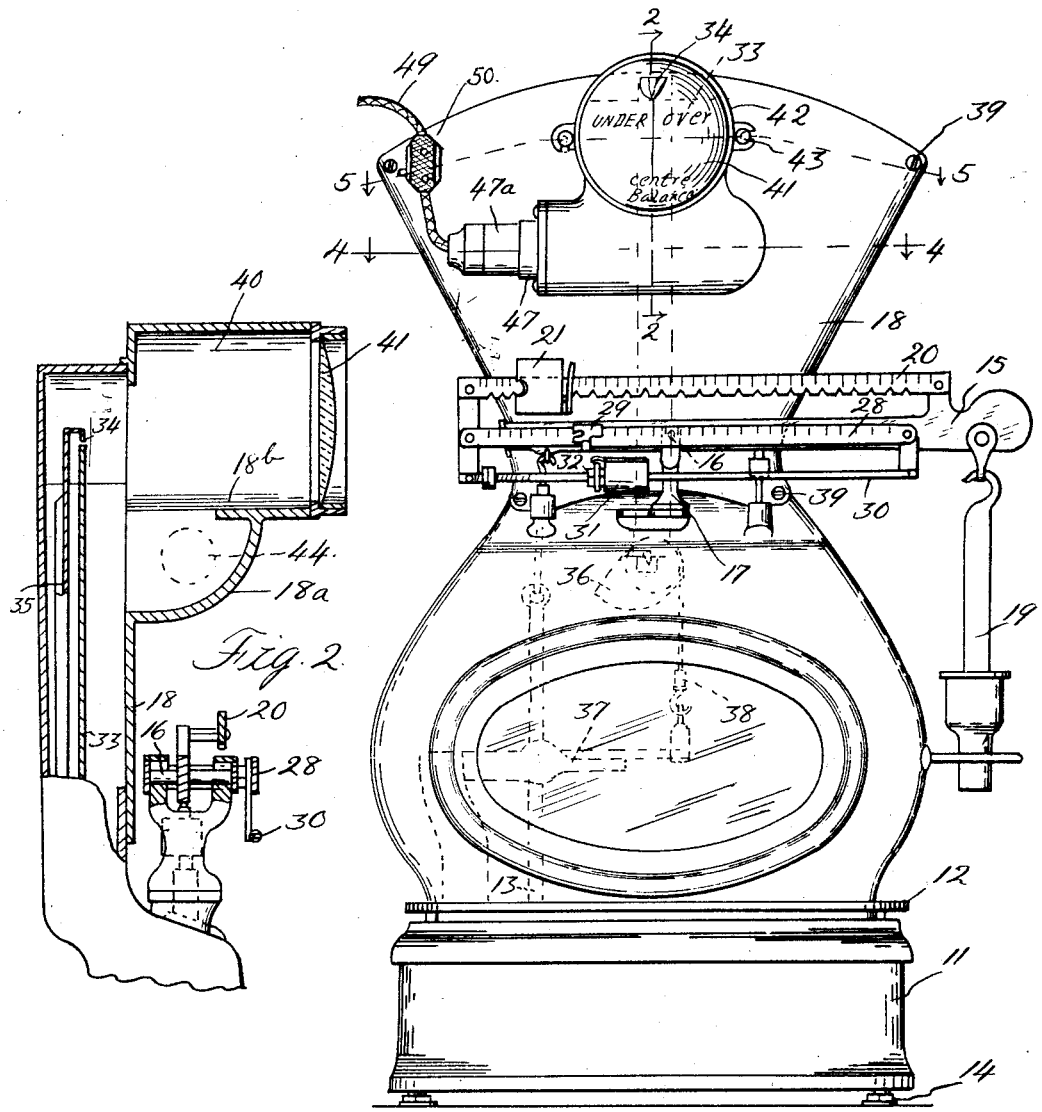
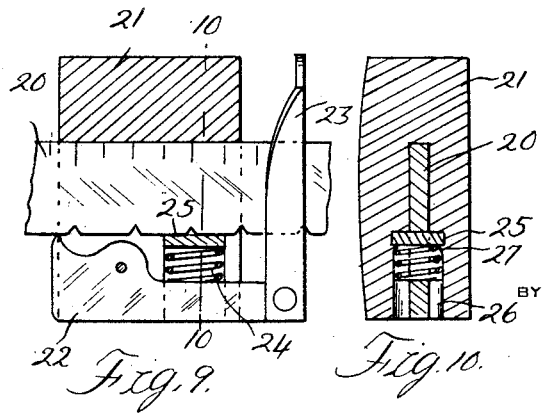
INVENTOR,
Modeste J. Lachance
BY Swan & Frye.
ATTORNEYS

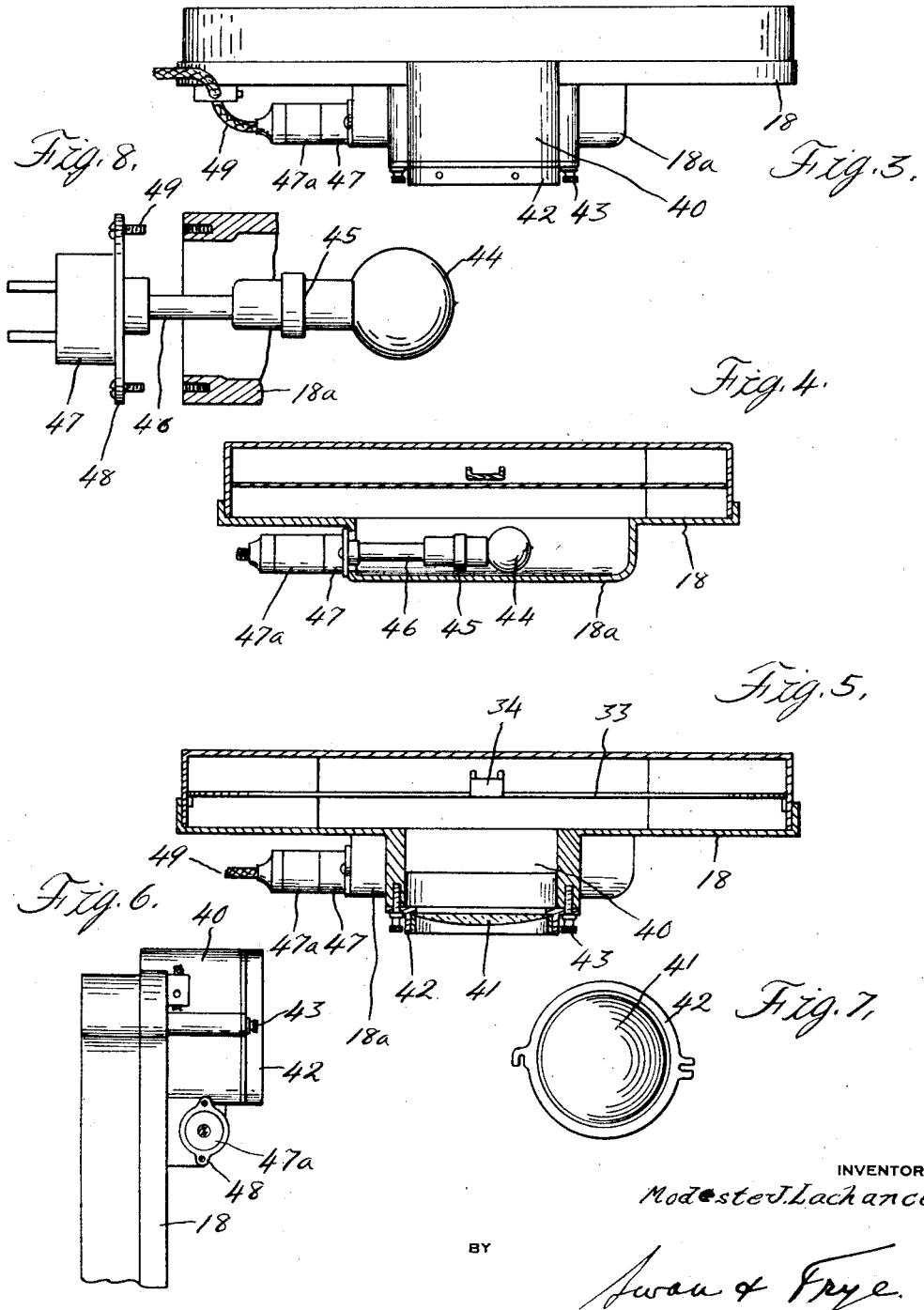

Patented July 7, 1931

1,813,578

UNITED STATES PATENT OFFICE

MODESTE J. LACHANCE, OF LOUISVILLE, KENTUCKY, ASSIGNOR TO WALTER F. STIMPSON, OF DETROIT, MICHIGAN

COMPOUNDING SCALE

Application filed January 13, 1930. Serial No. 420,440.

This invention relates to weighing scales of the predetermined weight type, which are especially adapted for use in weighing desired quantities of various ingredients, such as, for example, in the compounding of materials for rubber tires.

In the use of compounding scales it is customary to have predetermined weights for each ingredient entering into the compound, and such weight is offset by means of a poise or hanging weight suitably mounted upon a scale lever, and the indicating mechanism of the scale is utilized principally for showing when the desired amount of material has been exactly offset. Such scales, however, are ordinarily difficult to read and adjust, and are difficult to maintain in exact balance, owing to the wearing of the interfitting poise pawls and beam notches particularly when the same notches are being constantly used. One of the objects of this invention is the elimination of these defects and the provision of a compounding scale that will have long life and easy readability.

Another object of this invention is the arrangement of the indicating mechanism of the scale with a flush type indicator arranged to align with the chart graduations at the widest portion of the chart, whereby slight differences in weight will be readily apparent.

A further object of this invention is the mounting upon a removable casing plate of a magnifying glass in alignment with the graduated portion of the chart, and with the frame of the magnifying glass readily removable for cleaning or substitution.

A further object of this invention is the arrangement of an illuminating bulb in an out-of-sight position below the magnifying glass whereby it will cast its light rays particularly upon the graduated portion of the chart and indicator with a portion of the same removable casing plate that carries the magnifying glass serving as a reflector for aiding in the concentration of the light rays where desired.

Other objects and advantages will be apparent from the accompanying drawings illustrating a preferred embodiment of my invention and wherein similar reference characters designate similar parts throughout the several views.

In the drawings:

Figure 1 is a front elevation of my improved scale.

Figure 2 is a detail cross section taken substantially on the line 2—2 of Figure 1.

Figure 3 is a plan view of the upper portion of the scale.

Figure 4 is a horizontal sectional view taken substantially on the line 4—4 of Figure 1.

Figure 5 is a similar view taken substantially on the line 5—5 of Figure 1.

Figure 6 is a side elevation of the upper part of the scale, taken from the left of Figure 1.

Figure 7 is a detail front elevation with the magnifying glass and frame removed from the scale.

Figure 8 is an enlarged detail view showing in elevation the mounting for the illuminating bulb, with the co-operating portion of the scale shown in section.

Figure 9 is an enlarged vertical section through the weight-offsetting poise, and Figure 10 is a detail cross section taken substantially on the line 10—10 of Figure 9.

Referring now to the drawings, the numeral 11 designates the base of the scale in which are mounted suitable scale levers (not shown) adapted to support the platform 12 and suitably multiply the movement of such platform when a load is placed thereon so that a proportionately greater movement would be imparted to the steelyard rod 13, in the usual manner of weighing scales. Adjustable feet 14 may also be carried by the base 11 to provide for leveling the scale in its desired position of use. The steelyard rod 13 connects the nose iron pivot of the platform-supporting levers to the power pivot of the main load-offsetting beam 15, which is fulcrumed as at 16 intermediate the ends of the beam upon a yoke 17 fixed upon the scale housing above the base 11 and forwardly of the removable casing plate 18, which covers the indicating mechanism. The main beam preferably carries a plurality of graduated beams on which suitable poises may be adjusted at will to vary the load-offsetting capacity of the beam or counterbalance various weights upon the scale platform. In the illustrated embodiment in upper beam 20 is arranged with suitable graduations on its face and spaced notches in its lower edge. A comparatively heavy poise 21 is mounted for sliding movement upon the beam 20 and is provided with a pivoted retaining lever 22 which has one extremity shaped to snugly fit into any of the notches on the underside of the beam 20. The opposite arm of the lever 22 carries a handle member 23 (note Figure 9) whereby the pointed extremity of the lever may be readily swung out of engagement with any portion of the beam, so that the poise 21 may be moved along the beam 20 without wear either to the notches of the beam or the pointed extremity of the securing lever. The handle member 23 extends to a position adjacent the upper portion of the poise 21 whereby movement of the poise by the same hand of the operator that swings the securing lever out of the notches may be facilitated. A spring 24 normally presses the extremity of the handle member 23 away from the body portion of the poise 21, and also tends to press the pointed extremity of the securing lever 22 against the underside of the beam or into one of the notches on the beam 20. Means are also provided for preventing tilting of the poise 21 either during the sliding movements of the poise along the beam 20 or during the weighing operations of the scale. As best shown in Figures 9 and 10, the poise 21 is formed with a slot of but slightly greater width than the thickness of the beam 20 and extending from the underside of the poise upwardly to beyond the center of the poise. The upper wall of such slot is machined to snugly engage the upper surface of the beam and the side walls of the slot are sufficiently close to the sides of the beam to prevent substantial sidewise movement of the poise relatively to the beam while allowing ready sliding of the poise upon the beam. The poise 21 is further provided with an abutment plate 25 arranged to engage the under side of the beam 20 over a substantial area to prevent tilting of the poise longitudinally of the beam 20. As herein shown the abutment plate 25 is suitably secured at the upper extremity of a drilled opening 26 in the lower face of the poise 21, as by swaging wall portions of the opening adjacent the lower surface of the abutment plate, as shown at 27 in Figure 10. The opening 26 in the poise also provides for housing the spring 24 between the abutment plate 25 and the securing lever 22. Other graduated beams may be secured upon the main beam 15 as desired, and in the illustrated embodiment is shown a somewhat shorter graduated beam 28 on which is mounted a comparatively light slidable poise 29, whereby this beam might be utilized for offsetting ounces and fractional ounces for securing fine weights. A third beam 30 is shown on the lower extremity of the main beam 15 and is not graduated, a poise 31 being movable thereon and then locked in any desired position by means of lock nuts 32. This poise is preferably used for offsetting tare, as where repeated weighings of material are made into a box, pan, or other container, the weight of which is substantially constant. However, this poise may also be utilized for effecting initial balance of the scale, or otherwise, as desired.

Upon the main beam 15 on the opposite side of the fulcrum pivot 16 from the connection to the steelyard rod is suspended a removably weight-supporting member 19 upon which may be mounted suitable loose weights for offsetting any desired load in excess of the load-offsetting capacity of the poises. This member 19 may also carry the usual shot-box or like means for aiding in initially balancing the scale.

The indicating mechanism of the scale is herein shown as comprising a chart 33 (note Figures 1 and 2) on which is located substantially centrally thereof a line with which a pointer 34 on a movable indicating hand 35 is aligned when the scale is in balance or a desired load upon the scale platform is exactly offset. At the sides of such central indication are preferably arranged smaller spaced graduations and the words "over" and "under" marked on the chart on opposite sides of the central indication to readily inform the operator substantially how much material should be added to or taken from to bring the indicating hand 35 into exact alignment with the central indicator. The indicating hand 35 is herein shown as carried by a pendulum 36 pivoted within the scale housing below the main beam 15 and connected with the nose iron pivot of the platform-supporting levers through suitable mechanism, such as an intermediate lever 37 fulcrumed at one extremity within the scale housing and connected at its other extremity with the lower extremity of a link 38, the other extremity of which is connected with the pendulum 36. Intermediate its ends the lever 37 is pivotally connected with the nose iron pivot of the platform-supporting levers, through a suitable link (not shown).

This construction lends itself readily to repeated weighings at predetermined weights. For example, should a number of weighings of five pounds of material be desired, it is only necessary to put the poise 21 with its pointed lever extremity in the requisite notch, and if a container is to be used offsetting the weight of the container through appropriate movement of the poise 31, then material is introduced into the container until the indicator hand 35 is moved so that its pointer 34 exactly aligns with the central indication on the chart. As the indicating hand approaches the central indication, its movement is easily observable by the operator, and skilled operators rapidly acquire the knack of slowing the placing of material into the container so that the indicator hand is brought to precise alignment with the central indication without too much material being placed in the container. Should it happen, however, that too much material is placed in the container, the extent of overage is apparent to the operator and the indicator hand moves back toward the central indication on the chart as material is removed. Obviously, fractional pound weights can readily be offset by movement of the relatively small poise 29, and the poises 21 and 29 can be used together as desired. Should it be desired to weigh a number of commodities into the same container, one or both of the poises 21 and 29, may be advanced beyond its then position until the desired position is reached to offset a total weight of the material and container plus the weight of the material about to be added. When the capacity of the beams 20 and 28 has been exceeded, one or more removable weights may be placed upon the hanging pan 19 in the usual manner of weighing scales.

It will be noted that the construction of the beam 20 and co-operating poise 21 is such that exact weights may be secured because of the rigid position of the poise in any adjusted position. Moreover, the poise may be readily slid upon the beam 20 without wear upon the notches on the under side of the beam or upon the pointed lever extremity, for the movement of the hand lever 23 toward the body of the poise clears such pointed extremity from the beam. The arrangement of the notches on the under side of the beam also prevents the settling of dust, or the like, within the notches.

The means for facilitating the reading of the indicating mechanism will now be described. Removably secured upon the upper portion of the scale housing, as by appropriate screws 39, is the removable cover plate 18, which carries both means to clearly illuminate the indicating mechanism and a mounting for a magnifying glass that will aid the operator in distinguishing the positions of the movable indicator. As best shown in Figures 2-7 the removable cover plate 18 closes the front portion of the scale casing above the scale beam 15, and side flanges thereof engage over the side walls of the scale housing so as to prevent the entrance of dust, moisture, etc., into the housing. In horizontal alignment with the graduated portion of the chart the cover plate 18 is formed with a cylindrical portion 40 acting in the manner of a telescope barrel and at the front extremity of which is mounted the magnifying glass 41. The magnifying glass is appropriately mounted in a ring 42 provided with slotted ears for co-operation with screws 43, or like securing elements, and for convenience in mounting and demounting the slots in the ears may be arranged at right angles to each other, substantially as shown in Figure 7.

The cover plate 18 also carries the means for electrically illuminating the chart and indicator of the scale, and arrangement for mounting such illuminating means renders it unnecessary to remove the cover plate 18 should it become necessary to replace an electric bulb or adjust the location of such bulb relatively to the indicating mechanism. As best shown in Figures 1, 4 and 8, the electric bulb 44 is removably secured in a light socket 45 mounted at one extremity of a hollow stem 46 through which suitable electric wires connect the terminals of the socket 45 with the proper terminals of the fixed portion 47 of a conventional two-part plug connection, which plug member is provided with an apertured flange 48 by means of which this illuminating assembly may be conveniently secured upon the cover plate 18, as by means of screws 49 passing through the apertures in the flange 48 and threading into sockets in the cover plate. Obviously, any shape bulb may be utilized in this illuminating assembly, and by changing the types of bulbs, as for example from a round bulb to one of the long cylindrical bulbs, it is possible to change the distribution of the light rays upon the chart to some extent, and also with the same bulb adjustment may be made relatively to the cover plate by inserting apertured shims or the like between the flange 48 and the adjacent portion of the cover plate. The cover plate is also formed to assist in directing the light rays upon the chart and indicator to the best advantage. Thus, the cover plate is formed with a curved forwardly and upwardly extending wall 18$^a$ (note Figure 2) below and in front of the light bulb 45, which wall serves as a reflector for directing light rays upwardly and rearwardly upon the graduated portion of the chart 33 and the visible portion 34 of the indicator hand. The light rays are blocked off from direct engagement with the magnifying glass 41 by means of the extension 18$^b$ but are free to pass directly upward into the body of the barrel 40 back of the magnifying glass 41, whereby in addition to illuminating the chart, the bulb will thoroughly illuminate the interior of the magnifying glass support so as to eliminate some of the usual reflections or shadows which might distort the indication when viewed through the magnifying glass. When it is desired to illuminate the bulb 44 the companion plug member 47$^a$ is attached to the fixed plug member 47 (note Figure 4), the companion plug member being located at the end of a suitable cord 49 leading to a source of current supply, and in which is mounted a conventional switch member 50 having one or more control buttons. When the scale is used in the same location for a considerable period of time, the plug members 47 and 47ª are usually left in united relation, and the bulb illuminated or extinguished when desired by pushing the requisite button of the switch member 50.

While it will be apparent that the illustrated embodiments of my invention herein disclosed are well calculated to adequately fulfill the objects and advantages primarily stated, it is to be understood that the invention is susceptible to variation, modification and change within the spirit and scope of the subjoined claims.

1. In a scale, the combination of a chart having index graduations extending to the top thereof, an indicator hand movable behind the chart and having a portion bent forwardly and then downwardly into close proximity to said chart, the downwardly extending portion being arranged in the same vertical plane as the chart and bearing an index mark adapted to closely align with the graduations on the chart.

2. In a scale, the combination of a chart having index graduations extending to the top thereof, an indicator hand movable behind the chart and having its upper extremity bent forwardly and then downwardly into close proximity to said chart, the downwardly extending portion being arranged in the same vertical plane as the chart and bearing an index mark adapted to closely align with the graduations on the chart.

3. In a scale having a casing, the combination of a chart secured upon the casing in spaced relation to the rear wall thereof and having index graduations on its forward face extending to the top of the chart, and an indicator hand movable between the rear face of the chart and the rear wall of the casing and having its upper extremity bent forwardly and then downwardly into close proximity to the upper edge of said chart, the downwardly extending portion being arranged in the same vertical plane as the chart and bearing an index mark adapted to align with the graduations on the chart.

4. In a scale having a casing, the combination of a chart secured upon the casing in spaced relation to the rear wall thereof and having index graduations on its forward face extending to the top of the chart, an indicator hand movable between the rear face of the chart and the rear wall of the casing and having its upper extremity bent forwardly and then downwardly into close proximity to the upper edge of said chart, the downwardly extending portion being arranged in the same vertical plane as the chart and bearing an index mark adapted to align with the graduations on the chart, the front of the casing being adapted to be closed by a removable front plate carrying a forwardly extending barrel in substantial alignment with the graduated portion of the chart, and a magnifying glass removably mounted at the forward extremity of the barrel.

5. In a scale having a casing, the combination of a chart secured upon the casing in spaced relation to the rear wall thereof and having index graduations on its forward face extending to the top of the chart, an indicator hand movable between the rear face of the chart and the rear wall of the casing and having its upper extremity bent forwardly and then downwardly into close proximity to the upper edge of said chart, the downwardly extending portion being arranged in the same vertical plane as the chart and bearing an index mark adapted to align with the graduations on the chart, the front of the casing being adapted to be closed by a removable front plate carrying a forwardly extending barrel in substantial alignment with the graduated portion of the chart, a magnifying glass removably mounted at the forward extremity of the barrel, said front plate also carrying a mounting for an electric lamp, and a screen for preventing impinging of light rays from the lamp directly upon the magnifying glass.

6. In a scale having a casing, the combination of a chart secured upon the casing in spaced relation to the rear wall thereof and having index graduations on its forward face extending to the top of the chart, an indicator hand movable between the rear face of the chart and the rear wall of the casing and having its upper extremity bent forwardly and then downwardly into close proximity to the upper edge of said chart, the downwardly extending portion being arranged in the same vertical plane as the chart and bearing an index mark adapted to align with the graduations on the chart, the front of the casing being adapted to be closed by a removable front plate carrying a forwardly extending barrel in substantial alignment with the graduated portion of the chart, a magnifying glass removably mounted at the forward extremity of the barrel, said front plate being also formed with a light reflecting wall below said barrel, an electric lamp removably mounted upon the front plate in proximity to said reflecting wall, and a screen arranged between said lamp and magnifying glass.

7. In a scale having a casing, the combination of a chart secured upon the casing in spaced relation to the rear wall thereof and having index graduations on its forward face extending to the top of the chart, an indicator hand movable between the rear face of the chart and the rear wall of the casing and having its upper extremity bent forwardly and then downwardly into close proximity to the upper edge of said chart, the downwardly extending portion being arranged in the same vertical plane as the chart and bearing an index mark adapted to align with the graduations on the chart, and means for facilitating reading of said chart comprising a magnifying glass mounted upon the casing forwardly of the chart, and means for illuminating the chart arranged forwardly of the chart below the magnifying glass.

8. In a scale having a casing, the combination of a chart secured upon the casing in spaced relation to the rear wall thereof and having index graduations on its forward face extending to the top of the chart, an indicator hand movable between the rear face of the chart and the rear wall of the casing and having its upper extremity bent forwardly and then downwardly into close proximity to the upper edge of said chart, the downwardly extending portion being arranged in the same vertical plane as the chart and bearing an index mark adapted to align with the graduations on the chart, and means for facilitating reading of said chart comprising a barrel mounted upon the casing forwardly of the chart, a magnifying glass removably secured adjacent the said extremity of the barrel, an electric lamp removably secured upon the casing forwardly of the chart and below the barrel, and a screen arranged between said lamp and magnifying glass to prevent passage of light rays directly to the glass.

9. In a scale having indicating mechanism including a chart with a fixed index mark thereon and an indicating hand movable behind the chart to both sides of said mark, of means for facilitating reading of said indicating mechanism comprising a magnifying glass arranged in horizontal alignment with and in front of said index mark, illuminating means mounted in front of and below said index mark, and a screen arranged between the magnifying glass and illuminating means to prevent passage of light rays directly to the glass.

10. In a scale having indicating mechanism including a chart with a fixed index mark thereon and an indicating hand movable behind the chart to both sides of said mark, of means for facilitating reading of said indicating mechanism comprising a magnifying glass arranged in horizontal alignment with and in front of said index mark, illuminating means mounted in front of and below said index mark, and a screen arranged between the magnifying glass and illuminating means to prevent passage of light rays directly to the glass, said magnifying glass and illuminating means being mounted upon a single member adapted to be removably secured adjacent the chart.

11. In a scale having a substantially fan-shaped housing, indicating mechanism arranged therein and comprising a substantially fan-shaped chart secured to said housing in spaced relation to the rear wall of the housing and bearing a fixed index mark thereon intermediate the side edges of the chart, an indicator hand movable between the chart and rear wall of the housing to both sides of said mark, and means for facilitating the reading of said indicating mechanism comprising a magnifying glass mounted upon said housing in horizontal alignment with and in front of said index mark and illuminating means mounted upon the housing in front of and below said index mark.

12. In a scale having a substantially fan-shaped housing, indicating mechanism arranged therein and comprising a substantially fan-shaped chart secured to said housing in spaced relation to the rear wall of the housing and bearing a fixed index mark thereon intermediate the side edges of the chart, an indicator hand movable between the chart and rear wall of the housing to both sides of said mark, and means for facilitating the reading of said indicating mechanism comprising a magnifying glass mounted upon said housing in horizontal alignment with and in front of said index mark and illuminating means mounted upon the housing in front of and below said index mark, said magnifying glass and illuminating means being mounted upon a removable plate adapted to close the front of the housing.

13. In a scale having a substantially fan-shaped housing, indicating mechanism arranged therein and comprising a substantially fan-shaped chart secured to said housing in spaced relation to the rear wall of the housing and bearing a fixed index mark thereon intermediate the side edges of the chart, an indicator hand movable between the chart and rear wall of the housing to both sides of said mark, and means for facilitating the reading of said indicating mechanism comprising a removable front plate adapted to form the front wall of the housing and carrying a magnifying glass in substantially horizontal alignment with said index mark, illuminating means arranged below the magnifying glass, and a screen arranged between the magnifying glass and illuminating means to prevent passage of light rays directly to the glass.

In testimony whereof I sign this specification.

MODESTE J. LACHANCE.